United States Patent [19]
Iizuka

[11] 3,877,355
[45] Apr. 15, 1975

[54] AUTOMOTIVE AIR CONDITIONER ASSEMBLY

[75] Inventor: Mitsuru Iizuka, Yokohama, Japan

[73] Assignee: Nissan Motor Company, Limited, Yokohama, Japan

[22] Filed: May 22, 1974

[21] Appl. No.: 472,368

[30] Foreign Application Priority Data
May 23, 1973  Japan.............................. 48-61156

[52] U.S. Cl......................................... 98/2; 62/244
[51] Int. Cl............................................. B60h 1/24
[58] Field of Search ......... 98/2.05, 2.06, 2.07, 2.08, 98/2.09; 62/243, 244

[56] References Cited
UNITED STATES PATENTS

| | | | |
|---|---|---|---|
| 2,800,068 | 7/1957 | Arnold | 98/2.06 |
| 3,084,866 | 4/1963 | Keightley | 98/2.07 |
| 3,683,783 | 8/1972 | Pedreni | 98/2.07 |
| 3,732,801 | 5/1973 | Wallis | 98/2.05 |

Primary Examiner—Meyer Perlin

[57] ABSTRACT

A temperature regulating unit with a control mechanism mounted on a support having one end rotatably mounted on a wall of the temperature regulating unit and the other end fixed on an instrument panel and a control casing mounted in an opening formed between the instrument panel and a console box of the vehicle.

4 Claims, 6 Drawing Figures

AUTOMOTIVE AIR CONDITIONER ASSEMBLY

This invention relates in general to automotive air conditioners including heating and cooling, and more particularly to an automotive air conditioner of the type which has control members movably mounted on a support connected to a temperature regulating unit and the front panels.

An automotive air conditioner generally includes a temperature regulating unit and a control mechanism which is fixed with clamps on the temperature regulating unit to form an integral structure therewith, and a control casing mounted within an opening formed between an instrument panel and a console box of the vehicle and fixed to the regulating unit. The control mechansim is operated by control knobs provided on the control casing for adjusting the amount, temperature and humidity of the air supplied from the temperature regulating unit to the passenger compartment of the vehicle through an air outlet which is also provided in the control casing. An adjustable grille is usually provided in the air outlet in the control casing for adjusting the direction of the air flow into the passenger compartment of the vehicle.

The air conditioner including the temperature regulating unit and the control mechanism has to be mounted in a fixed position behind the console box and at the same time it has to be fixedly connected to the control casing which is fitted into an opening preformed between the instrument panel and the console box. However, with an automotive air conditioner assembly of the construction just mentioned, difficulty is sometimes encountered when connecting the conditioner assembly with the control casing due to a misalignment of the assembly with respect to the control casing. The misalignment of the assembly is mostly attributable to dimensional manufacturing errors in the temperature regulating unit and/or the control mechanism. In order to solve the problem of misalignment or misfit of the assembly with respect to the control casing, it has been the conventional practice to mount the control casing in a larger opening to provide a wide gap between the control casing and the instrument panel or the console box so that the control casing is afforded with more lee-way for the misaligned assembly to fit into the opening.

The provision of a wide gap separating the control panel of the air conditioner assembly from the instrument panel or the console box is not desirable from the viewpoint of interior design since the gap spoils the appearance of the assembly. On the other hand, if the gap around the control casing of the air conditioner is too small, misfit often occurs between the control casing and the instrument panel or the console box, resulting in unpleasant rattling noises or deformation of the misfitting parts. Due to these difficulties, it has been a prime requisite that the air conditioner assembly, instrument panel and console box have precise and accurate relative dimensions to reduce the number of steps necessary in mounting the air conditioner assembly in position on the vehicle.

It is therefore an object of the present invention to provide an automotive air conditioner assembly of a construction which will eliminate the aforementioned difficulties inherent to the prior art counterparts.

It is another object of the present invention to provide an automotive air conditioner assembly for overcoming misalignment of the control mechanism with respect to other fixed structures of the vehicle.

It is still another object of the present invention to provide an automotive air conditioner assembly wherein the control mechanism and the control casing may be mounted independently of each other without being influenced by misalignment.

It is a further object of the present invention to provide an automotive air conditioner assembly which can be mounted in position in a reduced number of steps.

The automotive air conditioner assembly according to the present invention comprises a temperature regulating unit fixedly mounted on a body structure of the vehicle for supplying air to the passenger compartment of the vehicle under controlled conditions; a control casing fitted into an opening and secured with clamps to an instrument panel and a console box and divided into an upper space and a lower space by a transverse partition in the casing; an air duct connecting the output of the temperature regulating unit to the upper space of the casing; an air grille adjustably mounted in the upper space of the control casing for controlling direction of air supplied through the air duct to the passenger compartment; and a control mechanism mounted on an elongate support body for controlling the temperature regulating unit; the support body having one end rotatably supported on a wall of the temperature regulating unit and the other end securely fixed to the instrument panel, the control box and control panel; the fixed end of the support body carrying a cover plate of the lower space of the control casing.

The above and other objects, features and advantages of the present invention will become clear from the following description and the appended claims, taken in conjunction with the accompanying drawings which show a preferred embodiment of the invention and wherein:

Figure 1:
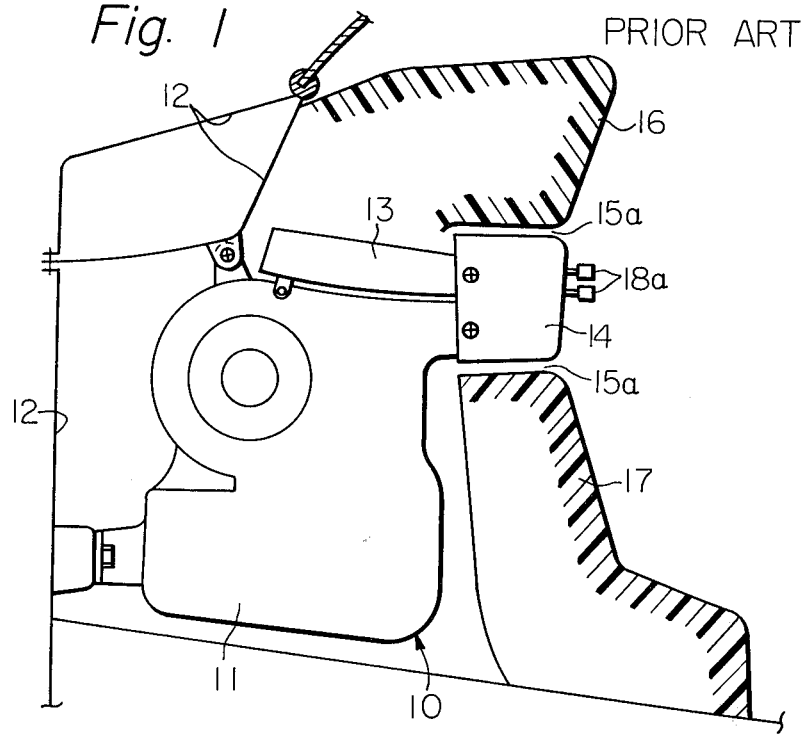
FIG. 1 is a fragmentary elevation view, partially in section, of a prior art automotive air conditioner assembly.
Figure 2:
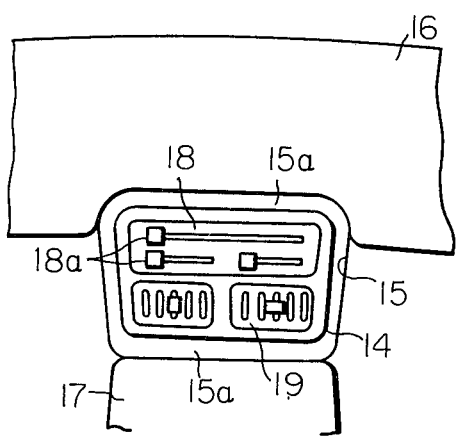
FIG. 2 is a fragmentary front view of the assembly shown in FIG. 1.
Figure 4:
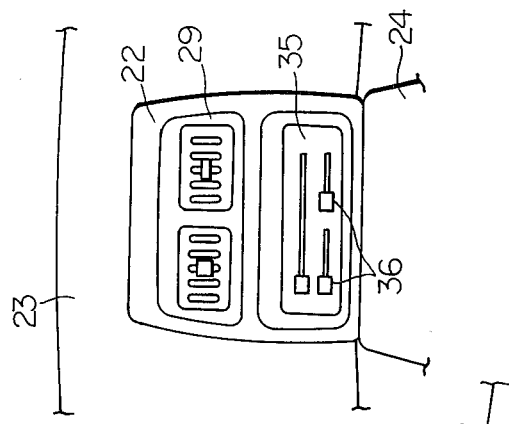
FIG. 4 is a fragmentary front view of the assembly of the invention shown in FIG. 3.
Figure 3:
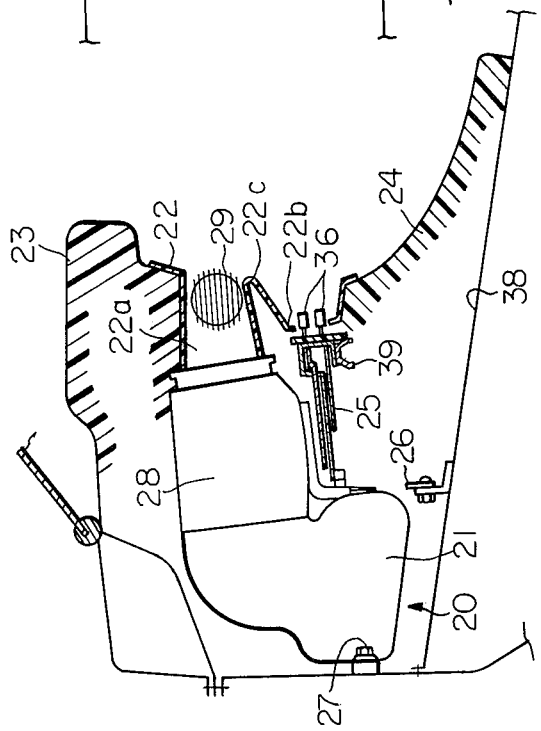
FIG. 3 is a view similar to FIG. 1 but shows an automotive air conditioning assembly embodying the present invention.

Referring to the accompanying drawings and first to FIGS. 1 and 2 which show a prior art automotive air conditioner assembly, the air conditioner 10 generally comprising a temperature regulating unit 11 which is fixedly mounted on rigid body structures 12 of a vehicle by suitable clamping means such as bolts or screws, a control mechanism 13 fixedly mounted on the temperature regulating unit 11, and a control casing 14 mounted in a fixed position within an opening 15 formed between an instrument panel 16 and a console box 17 in the passenger compartment of the vehicle and clampingly connected to the fore ends of the temperature regulating unit 11 and the control mechanism 13. The control casing 14 accommodates a cover panel 18 and its adjusting knobs 18a which are connected to the control mechanism 13 for adjusting the amount, temperature and/or humidity of the air supplied from the air temperature regulating unit 11. Air is supplied under controlled conditions from the temperature regulating unit 11 to the passenger compartment of the vehicle through an air grille 19 which is mounted in the control casing 14 for adjusting the direction of air flow into the passenger compartment.

As mentioned hereinbefore, it has been conventional to provide a large opening 15 between the instrument panel 16 and the console box 17 to leave a gap 15a of a substantial size to allow the control casing 14 to fit into a possibly misaligned temperature regulating unit 11 and the control mechanism 13. However, the provision of the gap 15a around the control casing 14 is not desirable for the reasons mentioned hereinbefore.

Referring now to FIGS. 3 to 6, the air conditioner assembly according to the present invention includes a temperature regulating unit 21 to supply air under controlled conditions, a control casing 22 fixedly fitted into an opening formed between an instrument panel 23 and a console box 24 in the passenger compartment of the vehicle, and a control mechanism 25 for adjusting the amount, temperature and humidity of the air supplied from the temperature regulating unit 21. The temperature regulating unit 21 is supported on an angular rigid support structure 26 and secured at its bottom end to a rigid body structure of the vehicle by a suitable clamping means as at 27.

The control casing 22 of the air conditioner assembly is divided into an upper space 22a and a lower space 22b by a transverse partition 22c. The temperature regulating unit 21 has integrally connected thereto an air duct 28. The air duct 28 connects the output end of the temperature regulating unit 21 to the upper space 22a of the control casing 22 which forms an outlet for the air to the passenger compartment of the vehicle from the temperature regulating unit 21. In the usual manner, the upper space 22a of the control casing 22 has mounted therein an air grille 29 for adjusting the direction of air flow into the passenger compartment.

The control mechanism 25 includes control members 30 movably on an elongate support body 31. One end of the support body 31 is pivotally supported on a wall of the temperature regulating unit 21 by means of a suitable movable joint. For example, the inner end of the support body 31 may be pivotally supported on a bracket 32 on the support structure 26 with use of a flanged shaft 33 and a snap ring 34 as shown particularly in FIG. 6. The other or outer end of the support body 31 is angularly folded to provide a vertical portion 31a and a horizontal portion 31b. The vertical portion 31a of the support body 31 has secured thereto a cover plate 35 by suitable fixing means as at 35a and has slots similar to the cover plate 35 for guiding the fore ends of the control members 30 which are fitted with adjusting knobs 36. The slotted cover plate 35 is dimensionally selected to cover the opening in the lower space 22b of the control casing 22.

Figure 5:
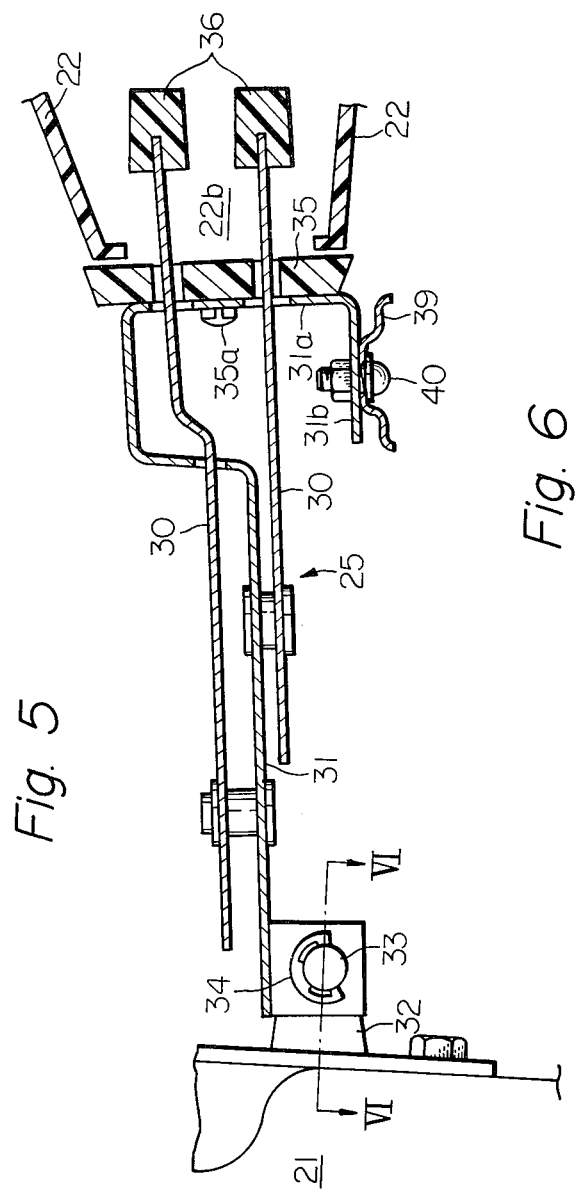
FIG. 5 is a section view showing on an enlarged scale control members of the assembly according to the invention.

The horizontal portion 31b at the fore end of the support body 31 is fixedly secured to a reinforcing member 39 of the instrument panel 23 with suitable means such as a bolt and a nut as shown at 40 in FIG. 5. The reinforcing member 39 is employed to increase the rigidity of the instrument panel structure 23 which is usually secured at opposite side ends to and supported on the body structure of the vehicle. In the present invention, the reinforcing member 39 also serves as a basic element for connecting the instrument panel 23, console box 24 and control casing 22 together. For this reason, it is important that the relative dimensions of the reinforcing member 39 and the respective structures to be connected by the reinforcing member 39 will be within predetermined tolerances.

Figure 6:
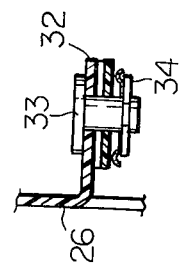
FIG. 6 is a section view taken along the line VI—VI of FIG. 5.

It will be appreciated that the inner end of the support body 31 of the control mechanism 25 may be rotatably supported by means of a ball joint or other rotatably linkage, instead of using the flanged shaft 33 and snap pin 34 particularly shown in FIG. 6.

The control casing 22 of the air conditioner assembly 20 is directly secured to the instrument panel 23 and the console box 24 with use of the reinforcing member 39 as described above. The console box 24 is fixedly mounted on a floor panel 38 of the vehicle in the usual manner.

It will be clear from the foregoing description that, with the automotive air conditioner assembly according to the present invention, the inner end of the support body 31 for the control members 30 is pivotally supported at one wall of the temperature regulating unit 21 while the horizontal portion 31b at the outer end of the support body 31 is secured to the instrument panel 23, so that the mounting position of the fore end of the support body 31 is determined by the instrument panel 23 and not by the control casing 22. The support body 31 of the control mechanism 25 can adapt itself to the position determined by the instrument panel 23 by way of pivotal movement about the shaft 33. More particularly, the control mechanism 25 may be easily mounted in position without difficulty caused by dimensional manufacturing errors in the temperature regulating unit 21.

Furthermore, since the control mechanism 25 is not fixed directly to the control casing 22, the latter may be mounted in position independently without difficulty caused by dimensional or positional manufacturing errors, if any, of the former.

What is claimed is:

1. An air conditioner assembly for a motor vehicle having a passenger compartment including an instrument panel, a console box and an air conditioner mounting opening formed between said instrument panel and said console box, the air conditioner assembly having:

a temperature regulating unit fixedly mounted on a body structure of the vehicle for supplying air to the passenger compartment under controlled conditions;

a control casing fitted into the opening and secured to the instrument panel and the console box and divided into an upper space and a lower space by means of a transverse partition of the casing;

a cover plate covering the lower space;

an air duct connecting the temperature regulating unit to the end open into the upper space of the casing;

said assembly being characterized in that:

an elongate support body is pivotally connected to a wall of the temperature regulating unit at one end and securely fixed to the instrument panel, the console box and the control casing at the other end and that the cover plate is fixedly carried by the fixed end of said elongate support body.

2. An air conditioner assembly as in claim 1, wherein said elongate support body is forming at its fixed end a vertical and a horizontal portion the vertical portion carrying the cover plate and the horizontal portion carrying a reinforcing member through which the instrument panel, the console box and the control casing are securely fixed to said elongate support body.

3. An air conditioner assembly as in claim 2, further comprising a control mechanism for controlling the temperature regulating unit, the mechanism being mounted on said elongate support body.

4. An air conditioner assembly as in claim 3, wherein the control mechanism includes control members movably mounted on said elongate support body and extending into the passenger compartment through slots formed in said vertical portion of said elongate support body and corresponding slots formed in the cover plate.

* * * * *